United States Patent [19]

Wade

[11] 4,069,098
[45] Jan. 17, 1978

[54] EX-VESSEL NUCLEAR FUEL TRANSFER SYSTEM

[75] Inventor: Elman E. Wade, Ruffsdale, Pa.

[73] Assignee: Westinghouse Electric Corporation, Pittsburgh, Pa.

[21] Appl. No.: 660,746

[22] Filed: Feb. 23, 1976

[51] Int. Cl.² .................. G21C 19/22; G21C 19/20; B66C 17/08
[52] U.S. Cl. ..................... 176/31; 176/30; 214/18 N
[58] Field of Search ................ 176/30, 31, 32, 87, 176/; 214/17 R, 17 A, 18 N, 103

[56] References Cited

U.S. PATENT DOCUMENTS

| B 373,344 | 2/1976 | Katz | 176/30 |
|---|---|---|---|
| 3,293,136 | 12/1966 | Harris | 176/30 |
| 3,354,040 | 11/1967 | Frame | 176/30 |
| 3,862,001 | 1/1975 | Marmonier | 176/30 |
| 3,952,885 | 4/1976 | Schabert | 176/30 |

Primary Examiner—Stephen C. Bentley
Assistant Examiner—Donald P. Walsh
Attorney, Agent, or Firm—L. A. DePaul; Z. L. Dermer

[57] ABSTRACT

A system for transferring fuel assemblies between a fuel transfer area and a fuel storage area while the fuel assemblies remain completely submerged in a continuous body of coolant. A fuel transfer area filled with reactor coolant communicating with the reactor vessel below the reactor coolant level, provides a transfer area for fuel assemblies in transit to and from the reactor vessel. A positioning mechanism comprising at least one rotatable plug disposed on a fuel transfer tank located outside the reactor vessel cooperates with either the fuel transfer area or the fuel storage area to position a fuel assembly in transit. When in position, a transporting mechanism cooperating with the positioning mechanism lifts or lowers a chosen fuel assembly. The transporting mechanism together with the positioning mechanism are capable of transferring a fuel assembly between the fuel transfer area and the fuel storage area.

8 Claims, 4 Drawing Figures

EX-VESSEL NUCLEAR FUEL TRANSFER SYSTEM

CROSS-REFERENCES TO RELATED APPLICATIONS

The invention herein disclosed is related to copending application Ser. No. 660,744, filed Feb. 23, 1976, entitled "Nuclear Reactor Fuel Transfer System", by E. E. Wade which is assigned to the present assignee.

BACKGROUND OF THE INVENTION

This invention relates to refueling systems for a nuclear reactor and more particularly to a system for transferring reactor fuel assemblies between a fuel storage area and a fuel transfer area while the fuel assemblies remain completely submerged in a continuous body of coolant.

During the refueling of sodium cooled fast breeder reactors, it is necessary to remove the decay heat from the irradiated fuel assemblies to prevent their reaching a temperature at which the fuel rod ruptures, because the rupture of the fuel rod results in the release of radioactive gases thus presenting health and contamination problems that are unacceptable. Therefore, it has become accepted practice to provide a means of dissipating the decay heat of an irradiated assembly by providing a system whereby the fuel assembly is kept submerged in a sodium coolant during transfer between the reactor and decay storage.

In most under sodium refueling systems, the means of keeping the fuel assembly submerged in sodium has been to place the fuel assembly in a sodium filled pot, a container with an open end, and then transfer the pot to the desired location. With this type of under sodium refueling system an auxiliary gas or liquid metal cooling system for the pot of sodium is always necessary to meet an emergency condition such as failure of the transfer means. In addition, the ever present possibility of failure of the auxiliary system must be dealt with by providing a backup system. Typically, the cooling capability of the gas system is limited to about 10 KW because of technology limitations. In large commercial fast breeder reactor plants the decay heat from a spent fuel assembly, at the time after reactor shutdown when it is economical to do refueling, is as much as 60 KW or greater. An auxiliary cooling system capable of safely removing that amount of heat, is not presently compatible with the entire reactor plant economics and technology.

In the British Prototype Fast Reactor (PFR) refueling system, the irradiated fuel assembly is stored in a rotor inside the reactor vessel for an initial decay period, and then moved through an opening in the reactor head into a transfer machine located outside of the reactor vessel, an ex-vessel transfer machine. The machine moves above an opening in a transfer tunnel, couples onto a mechanism around the opening, and lowers the fuel assembly through the opening. Equipment within the tunnel moves the fuel assembly laterally in the tunnel to beneath a second opening in the top of the tunnel. A crane mounted machine moves the fuel assembly through a valve on the opening into a fuel handling cell and into further storage prior to partial disassembly for shipping to reprocessing. Aside from the cost problems, there are problems associated with sophisticated interlocks that must be provided to insure against release of fission products during refueling because of the danger to operating personnel. In addition, the valves and adapters associated with coupling the ex-vessel transfer machine to the mechanism around the opening in the reactor head and to the mechanism around the opening in the tunnel are large and expensive. This coupling and uncoupling process is also quite time consuming which increases the refueling time.

The British Commercial Fast Reactor (CFR) refueling system stores the irradiated fuel assembly in a rotor inside the reactor vessel for an initial decay period, then moves it through an opening in the reactor head to a gas cooled compartment and then through an opening in the compartment into a sodium filled compartment outside of containment. The closures in the openings of the compartments are expensive to install and maintain.

The French Phenix and Phenix 4 refueling systems move the irradiated fuel assembly in a pot through an opening in the reactor head into a gas cooled compartment, then through an opening in the compartment into a decay storage rotor outside of the containment housing the reactor. After a decay period the fuel assembly is moved from the rotor through an opening into a fuel handling cell. In this concept a major safety problem would result if the cooling system of the gas cooled compartment fails and the sodium filled pot containing the fuel assembly becomes stuck in the compartment, as would happen in a power failure. This would result in the fuel assembly overheating and possibly rupturing the fuel rods releasing contaminants.

The Russian liquid metal power reactor refueling systems, in principle, handle the fuel assemblies similarly to the French and British, and are subject to similar problems.

Other reactor refueling systems have been conceptually designed which keep the fuel submerged in virtually an unlimited amount of sodium. In these concepts the fuel assembly is rotated about a horizontal axis into a horizontal position and then removed from the reactor vessel through an opening in the reactor vessel wall. In this system the sodium level in the ex-vessel transfer machine must be maintained at a higher level than the reactor vessel operating level. Consequently, the loss of this difference in coolant levels could result in loss of cooling to the fuel in transit. Also, the configuration of the horizontal axis machine requires a large lateral dimension significantly increasing the width of the containment building. In addition, the selection of bearings and seals for the horizontal machine is limited because of the constraint that they must operate under sodium.

SUMMARY OF THE INVENTION

A system for transferring fuel assemblies between the reactor core and the fuel storage area while the fuel assemblies remain completely submerged in a continuous body of coolant.

A fuel transfer area filled with reactor coolant provides a repository for fuel assemblies in transit between the reactor vessel and a fuel storage area. The fuel transfer area communicates with the reactor vessel below the reactor coolant level such that during refueling the coolant of the fuel transfer area and of the reactor vessel is a continuous body. Located outside the reactor vessel is an ex-vessel transfer machine comprising a transfer tank, a positioning mechanism, and a transporting mechanism. The fuel transfer tank communicates with both the fuel transfer area and the fuel storage area thus allowing fuel assemblies to be transferred therebetween. Disposed on the fuel transfer tank is the positioning mechanism with the transporting mechanism attached at an angle to the positioning mechanism. The positioning mechanism consists of at least one rotatable plug capable of positioning the transporting mechanism in appropriate relation to the fuel transfer or fuel storage areas. The transporting mechanism's inclincation with respect to the positioning mechanism allows transportation of a fuel assembly without placing the fuel assembly in a totally horizontal position. The fuel storage area, fuel transfer tank, and fuel transfer area are interconnected such that their coolant and the reactor vessel's coolant is a common continuous body. The transporting mechanism together with the positioning mechanism are capable of transferring a fuel assembly between the fuel transfer area and the fuel storage area without placing the fuel assembly in a horizontal position while the fuel assembly remains completely submerged in a continuous body of coolant.

It is an object of this invention to provide a means of transferring fuel assemblies from a fuel transfer area communicating with the reactor vessel to a fuel storage area while the fuel assembly remains completely submerged in a continuous body of coolant.

It is a more particular object of this invention to provide a means of transferring fuel assemblies from a fuel transfer area communicating with the reactor vessel to a fuel storage area without placing the fuel assembly in a horizontal position while the fuel assembly remains completely submerged in a continuous body of coolant.

It is a further object of this invention to provide a means of transferring fuel assemblies from a reactor vessel to an exit location outside of the reactor containment boundary while the fuel assemblies remain completely submerged in a continuous body of coolant.

BRIEF DESCRIPTION OF THE DRAWINGS

While the specification concludes with claims specifically pointing out and distinctly claiming the subject matter of the invention, it is believed the invention will be better understood from the following description taken in conjunction with the accompanying drawings, wherein:

DESCRIPTION OF THE PREFERRED EMBODIMENT

A nuclear reactor consists of a core containing fuel assemblies that produces heat. The core is contained within a pressure vessel having an inlet and outlet that permits the circulation of a coolant that cools the core. After a period of operation, the exhausted fuel assemblies must be replaced with fresh ones. An in-vessel transfer machine such as the one described in copending application Ser. No. 660,774, filed Feb. 23, 1976, entitled "Nuclear Reactor Fuel Transfer System" by E. E. Wade, which is assigned to the present assignee may be used to transfer fuel assemblies between the core and the fuel transfer area. The system described herein completes this refueling process.

Figure 1:
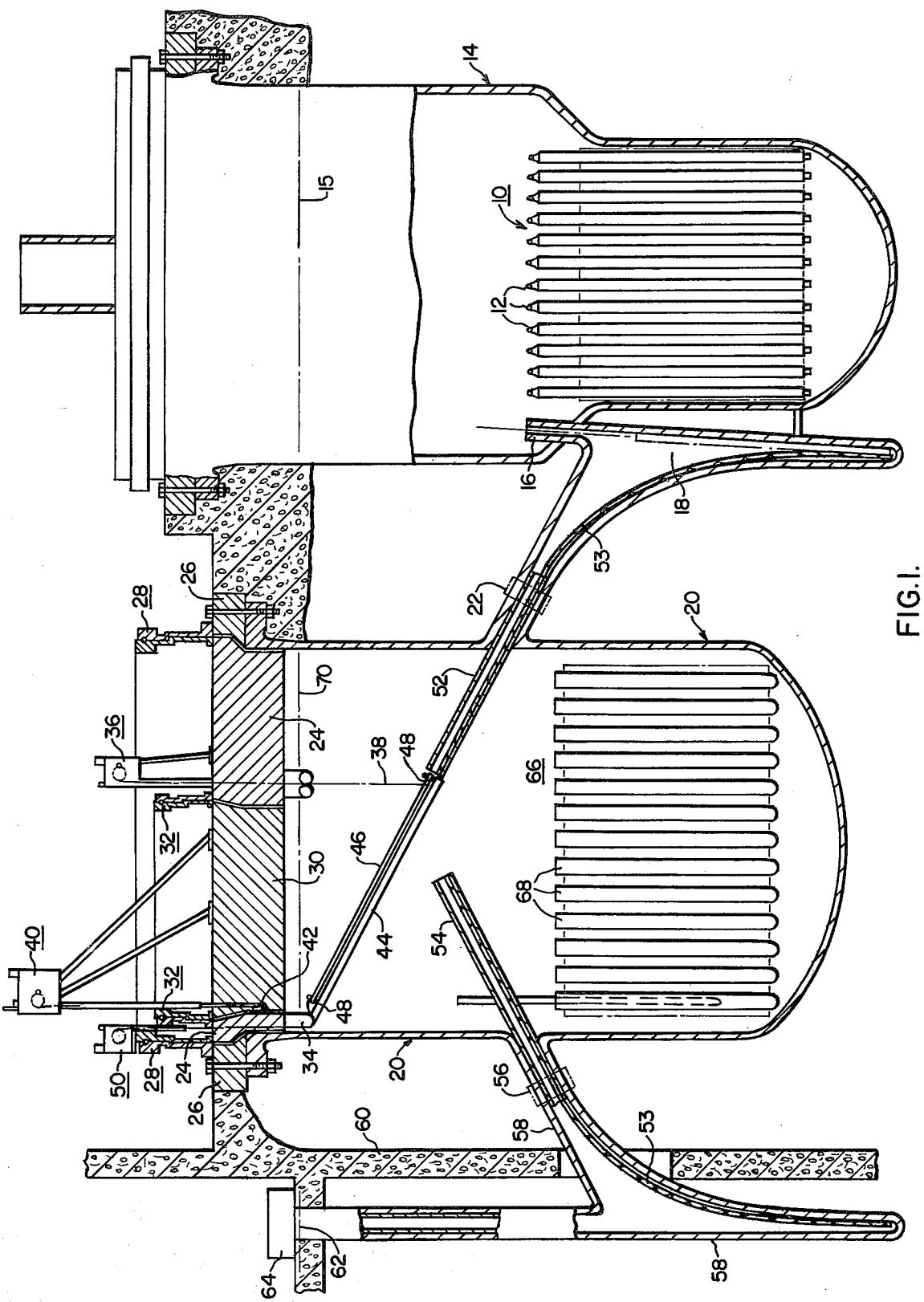
FIG. 1 is a cross-sectional elevation of the transfer system.

Referring to FIG. 1, a reactor core 10, consisting of multiple fuel assemblies 12, is disposed within the reactor vessel 14 below reactor coolant level 15. Disposed on the wall of reactor vessel 14 is fuel transfer nozzle 16 which connects the inside of reactor vessel 14 to the fuel transfer area 18. Fuel transfer area 18 serves as a temporary respository for fuel assemblies in their transfer to and from the reactor core 10.

Disposed outside reactor vessel 14 is fuel transfer tank 20 which houses fuel transfer equipment. Bellows 22 connects fuel transfer area 18 to the fuel transfer tank 20. The closure head of fuel transfer tank 20 provides a fluid tight boundary thus enclosing fuel transfer tank 20 and acts as a positioning mechanism for fuel transfer equipment located within fuel transfer tank 20. The closure head comprises a large rotatable plug 24, a stationary outer ring 26, a large riser assembly 28, a small rotatable plug 30, and a small riser assembly 32. The stationary outer ring 26 is bolted and sealed to the fuel transfer tank 20 by means well known in the art. The large rotatable plug 24 is supported from the stationary outer ring 26 by large riser assembly 28. The outer edge of large rotatable plug 24 together with the inner edge of stationary outer ring 26 define an annulus therebetween. The large riser assembly 28 which contains bearings, seals, and a plug drive mechanism (not shown) enables the large rotatable plug 24 to move relative to stationary outer ring 26 while maintaining a fluid tight boundary between the outside and inside of fuel transfer tank 20. In addition, the large riser assembly 28 locates the bearings, seals, and drive mechanism away from the hot surface of the large rotatable plug 24 thus providing a cooler operating environment and thus allowing a greater range of selectivity of bearing, seal, and drive mechanism materials. The particular selection and arrangement of the bearings, seals, and drive mechanism may be one of many well known in the art.

Small rotatable plug 30, having a small riser assembly 32 is disposed eccentrically within large rotatable plug 24. The small riser assembly 32 which contains bearings, seals, and drive mechanism (not shown) enables the small rotatable plug 30 to move relative to large rotatable plug 24 in a manner similar to that of large riser assembly 28.

A pivoting mechanism 34 is attached to the underside of large rotatable plug 24, while a chain control mechanism 36 having a chain 38 is mounted on the large rotatable plug 24 all in a manner well known in the art. Grapple control mechanism 40 having a grapple 42 is located on small rotatable plug 30. A carriage support 44 is attached at one end to pivoting mechanism 34 and at the other end to chain 38. The carriage support 44 supports fuel carriage 46 which has wheels 48. Activation of chain control mechanism 36 causes chain 38 to be raised or lowered thereby pivoting carriage support 44 in a vertical plane about pivoting mechanism 34. This pivoting capability allows the carriage support 44 to align fuel carriage 46 in various locations in the vertical plane. In addition, because the carriage support 44 is attached to large rotatable plug 24, the rotation of the large rotatable plus 24 provides a means of positioning carriage support 44 in a variety of positions in the horizontal plane. Therefore, these two assemblies provide a means for positioning carriage support 44 in a variety of positions in both the vertical and horizontal planes. Further, because carriage support 44 supports fuel carriage 46 which is capable of transporting a fuel assembly, this means provides the capability of positioning a fuel assembly in transit to and from the reactor core 10.

Chain control mechanism 36 is capable of lowering chain 38 thus pivoting carriage support 44 into a totally vertical position. When in a totally vertical position, rotation of the small rotatable plug 30 will place grapple 42 in alignment with fuel carriage 46. In this position, activation of grapple control mechanism 40 will lower grapple 42 into fuel carriage 46 where grapple 42 is capable of attaching to a fuel assembly located in fuel carriage 46. The grapple control mechanism 40 and grapple 42 may be a cam actuated grapple with a central rod having a camming surface of the kind disclosed in U.S. application Ser. No. 685,827, filed May 13, 1976, in the names of R. E. Meuschke and A. E. Statterlee, and assigned to the present assignee.

Fuel carriage 46 is attached to carriage control mechanism 50 which is located on the large rotatable plug 24. Carriage control mechanism 50 allows fuel carriage 46 with wheels 48 to move on the fuel carriage support 44. The carriage control mechanism may be chosen from those control mechanisms well known in the art such as a chain-sprocket-motor arrangement.

A reactor side tube 52 with tracks 53 extends from the inside of fuel transfer tank 20 to fuel transfer area 18. Bellows 22 are used to seal the fuel transfer tank 20 with fuel transfer area 18 while allowing possible thermal expansion and contraction of the reactor side tube 52. Reactor side tube 52 provides an access passage and support for the fuel carriage 46 as fuel carriage 46 moves on tracks 53 into fuel transfer area 18. Likewise, an exit-side tube 54 cooperates with bellows 56 and fuel transfer tank 20 connecting exit area 58 to fuel transfer tank 20. A portion of exit area 58 located outside of containment enclosure 60 and having coolant level 62 is sealed from the atmosphere by exit valve 64.

In this particular embodiment, the fuel storage area 66 having fuel assembly storage racks 68 is located in fuel transfer tank 20 which is filled with a coolant such as liquid sodium to a coolant level 70.

The invention provides a system for transferring a fuel assembly among the fuel transfer area 18, exit area 58, or fuel storage area 66 while the fuel assembly remains completely submerged in a continuous body of coolant and without positioning the fuel assembly in a totally horizontal position. Exit valve 64 together with exit area 58 also provide a means of removing or adding fuel assemblies to the system from outside the containment enclosure 60.

During refueling of the reactor core 10, the small rotatable plug 30 together with the chain 38 position the carriage support 44 such that the fuel carriage 46 is aligned with reactor side tube 52. When in this position, carriage control mechanism 50 lowers fuel carriage 46 on tracks 53 through reactor side tube 52 into fuel transfer area 18. Tracks 53 extend into fuel transfer area 18 such that when fuel carriage 46 is lowered into fuel transfer area 18, tracks 53 cause fuel carriage 46 to be aligned with fuel transfer nozzle 16. An appropriate in-vessel means such as the one described in copending application Ser. No. 660,744, filed Feb. 23, 1976, entitled "Nuclear Reactor Fuel Transfer System" by E. E. Wade, which is assigned to the present assignee, lowers a fuel assembly into the fuel carriage 46 and then both are lifted back through reactor side tube 52 and onto carriage support 44. Chain control mechanism 36 lowers chain 38 thereby pivoting carriage support 44 about pivoting mechanism 34 into a vertical position in alignment with grapple 42. Carriage control mechanism 50 then lowers fuel carriage 46. Grapple control mechanism 40 activates grapple 42 causing grapple 42 to attach to the fuel assembly in fuel carriage 46 as described above. Grapple 42 then lifts the fuel assembly out of the fuel carriage 46 and clear of the fuel assembly storage racks 68. In this position, the combined rotations of the large rotatable plug 24 and small rotatable plug 30 maneuver grapple 42 and the fuel assembly into alignment with a chosen fuel assembly storage rack 68. The grapple control mechanism 40 then lowers the grapple 42 and attached fuel assembly into the chosen fuel assembly storage rack 68. The process may be reversed thereby transporting a fuel assembly from the fuel storage area 66 into the fuel transfer area 18. In addition, in a similar manner the fuel carriage may be aligned with exit side tube 54 so that an assembly may be transferred into or out of exit area 58. Use of exit valve 64 allows removal of spent fuel assemblies from and the addition of new fuel assemblies to the exit area 58 from a point outside of the containment enclosure 60. Throughout the entire refueling process, the fuel assembly remains completely submerged below coolant levels 15, 70, and 62. The operation of the system provides a means of transferring a fuel assembly between a fuel transfer area and a fuel storage area or exit area while the fuel assembly remains completely submerged in a continuous body of coolant without placing the fuel assembly in a horizontal position.

Although FIG. 1 shows one embodiment of the invention, it is, of course, understood that other variations and modifications may be made therein; and it is intended to claim all such variations and modifications as fall within the true spirit and scope of the present invention. For instance, an alternative to the embodiment shown in FIG. 1 is shown in FIG. 2.

Figure 2:
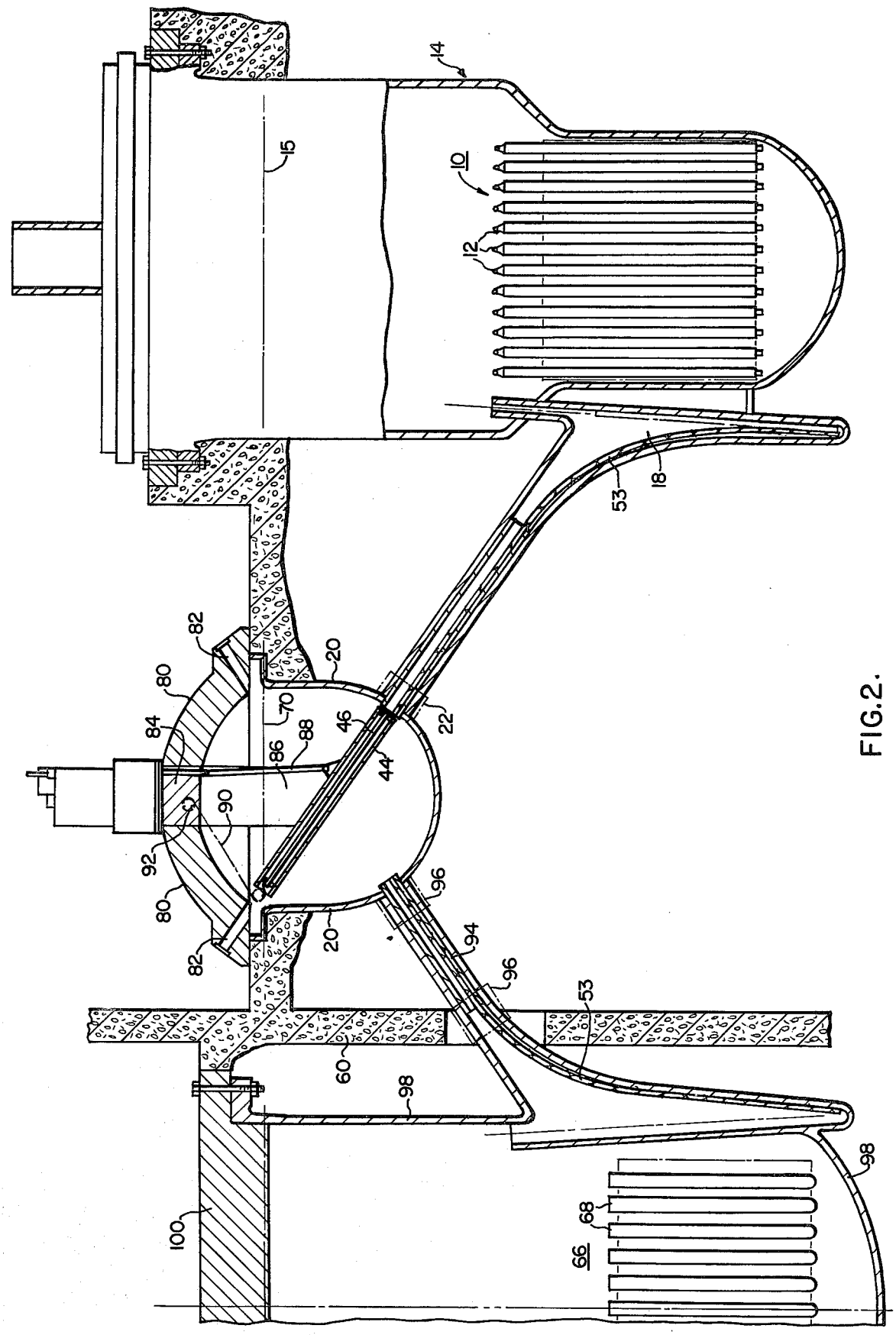
FIG. 2 is a cross-sectional elevation of an alternate embodiment of the transfer system.

Referring to FIG. 2, fuel transfer area 18 is attached to fuel transfer tank 20 by bellows 22. Disposed on fuel transfer tank 20 is tank cover 80 having inspection ports 82. A rotatable plug 84 having a support column 86 extending therefrom is disposed on tank cover 80. Carriage support 44 having fuel carriage 46 mounted therein is attached at an angle to support column 86 below coolant level 70. A positioning linkage 88 extends from the rotatable plug 84 to carriage support 44. A hoisting chain 90 attached to fuel carriage 46 is controlled by hoisting control 92. The transfer tank 20 is connected to the fuel storage area 66 located outside the containment enclosure 66 by a side tube 94 having bellows 96. The fuel storage area 66 having fuel assembly storage racks 68 is enclosed within fuel storage tank 98 having a closure head 100.

During refueling of the reactor, the rotatable plug 84 rotates about a vertical axis aligning carriage support 44 with the fuel transfer area 18. Hoisting control 92 then manipulates hoisting chain 90 thereby lowering the fuel carriage 46 into fuel transfer area 18. An appropriate in-vessel transfer means then lowers a fuel assembly into fuel carriage 46. Next, fuel carriage 46 with fuel assembly therein is lifted back onto carriage support 44. The rotatable plug 84 then aligns carriage support 44 with side tube 94 where fuel carriage 46 and the fuel assembly is lowered through side tube 94 into fuel storage area 66. An appropriate in-storage transfer means may then relocate the fuel assembly in the fuel storage area 66. The above-mentioned in-storage and in-vessel transfer means may be similar to the ex-vessel transfer means of FIG. 1. The process may be repeated in reverse order, moving a new fuel assembly from the fuel storage area 66 into the reactor core.

Bellows 96 and 22 provide a sealing mechanism and allow for thermal expansion and contraction. Inspection ports 82 are provided for inspection and emergency release of fuel carriage 46. In addition, positioning linkage 88 is capable of aligning carriage support 44 with rotatable plug 84 enabling the removal of both by a simple vertical lifting motion.

Figure 3:
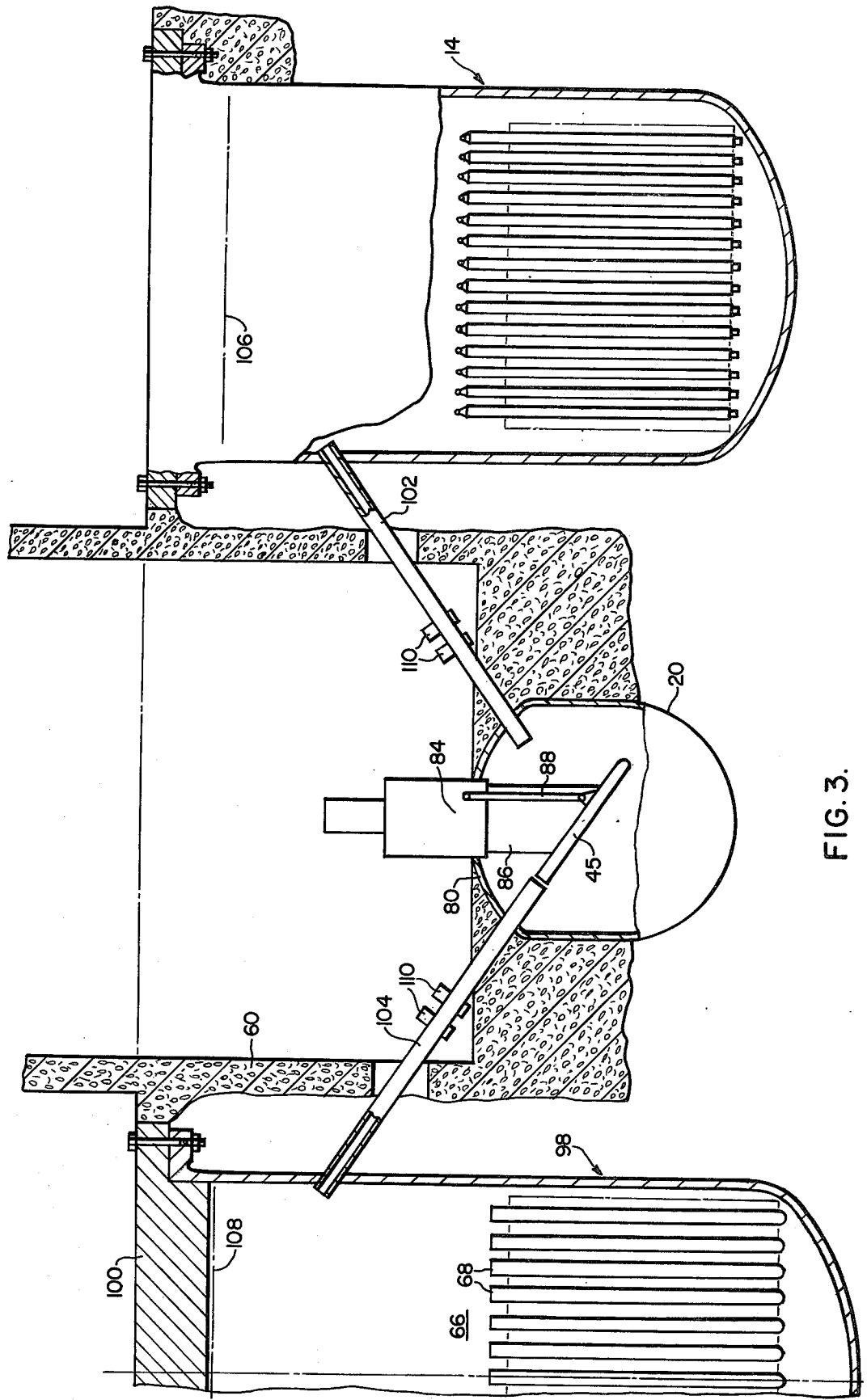
FIG. 3 is a cross-sectional elevation of a second alternate embodiment of the transfer system.
Figure 4:
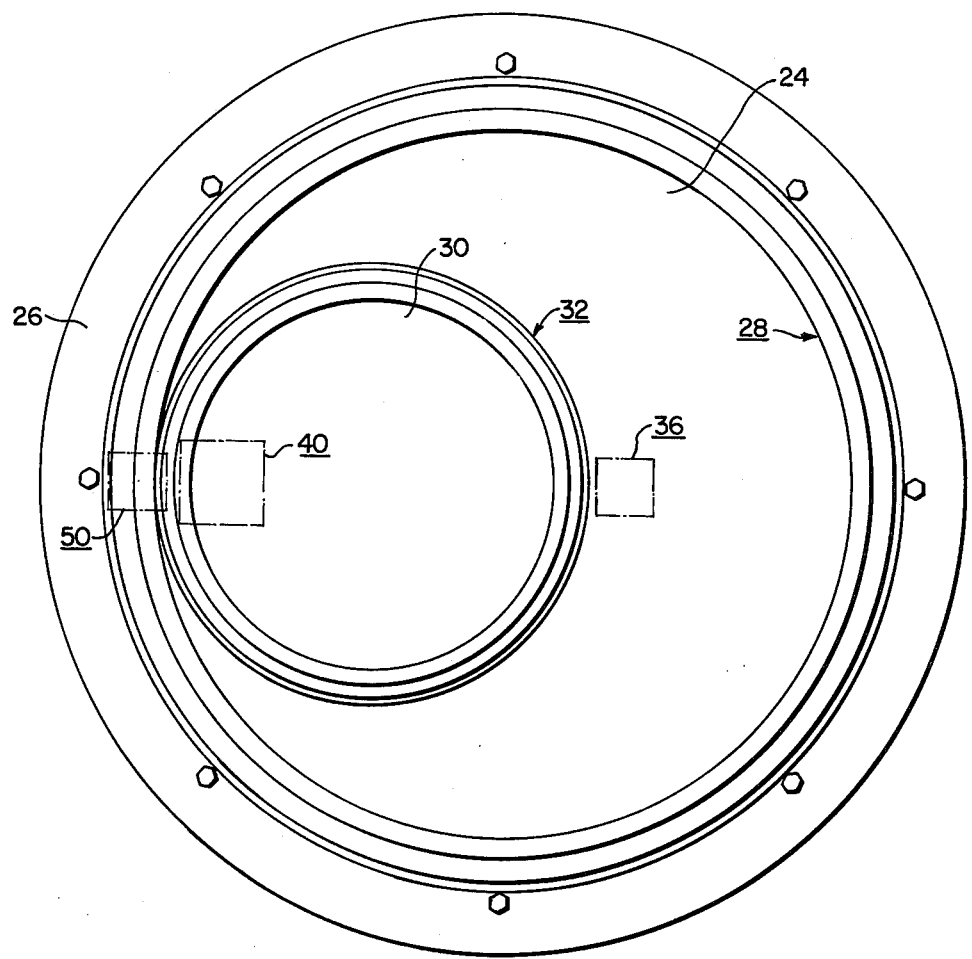
FIG. 4 is a plan view of the rotatable plugs of the ex-vessel transfer machine.

Another alternative to the embodiments shown in FIGS. 1 and 2 is that shown in FIG. 3. Referring to FIG. 3, the reactor vessel 14 having a coolant level 106 is connected to fuel transfer tank 20 by reactor side tube 102. Disposed on fuel transfer tank 20 is tank cover 80 having rotatable plug 84 disposed thereon. Extending from rotatable plug 84 is support column 86 having fuel carriage 45 attached thereto. A positioning linkage 88 attaches to fuel carriage 45. Storage side tube 104 connects fuel transfer tank 20 to fuel storage tank 98. Fuel storage tank 98 with coolant level 108 encloses the fuel storage area 66 having fuel assembly storage racks 68. The fuel storage tank is sealed by closure head 100.

In operation, rotatable plug 84 aligns fuel carriage 45 with reactor side tube 102 allowing an appropriate in-vessel means to lower a fuel assembly into fuel carriage 45. The rotatable plug 84 then positions fuel carriage 45 with storage side tube 104 from where an appropriate means transports the fuel assembly into fuel storage area 66. The process also may be used in reverse. The appropriate means used to lower the fuel assembly from the reactor and to raise the fuel assembly from the fuel transfer tank may be similar to the one disposed on the fuel transfer tank in FIG. 1. Also, gates 110 provide a means of isolating the fuel storage area, fuel transfer tank, and reactor vessel from each other.

In all embodiments, the transfer system is capable of transferring a fuel assembly between the fuel transfer area and the fuel storage area without placing the fuel assembly in a horizontal position while the fuel assembly remains completely submerged in a continuous body of coolant. The fuel being constantly under a continuous body of coolant is always in a good position for convective cooling, eliminating the need for auxiliary cooling systems of the prior art. Further, the fuel never comes above the operating floor of the reactor, thereby eliminating the possibility of sodium spills during reactor refueling.

The transferring mechanisms rotate about an essentially vertical axis which does not require a large lateral dimension as do the horizontal axis machines of the prior art. Moreover, most bearings and seals are located above the sodium level where the sodium cannot affect their operation, and since the fuel transfer area is well below the reactor coolant operating level, there is no need to maintain a higher coolant level during refueling than during operation, as the prior art requires.

It is anticipated that the plug controls, grapple, plug control mechanism, bearings, seals, and electrical systems be chosen from those well known in the art. For example, the carriage control mechanism 50 and the chain control mechanism 36 can be a simple chain hoist with appropriate limit switches.

I claim:

1. A nuclear reactor fuel transfer system comprising:
    a fuel transfer area located below the reactor operating coolant level, inclined at an angle to the horizontal and directly connected to the reactor vessel below said reactor operating coolant level for accommodating the transfer of fuel assemblies;
    a storage area located below said reactor operating coolant level and directly connected to said fuel transfer area and having an exit port disposed outside said reactor vessel and above said reactor operating coolant level for storing said fuel assemblies; and
    an ex-vessel transferring means disposed outside said reactor vessel and cooperating with said storage area and said fuel transfer area for transferring said fuel assemblies between said fuel transfer area and said storage area while said fuel assemblies remain at an angle to the horizontal and while said fuel assemblies remain completely submerged in a continuous body of reactor coolant.

2. The system recited in claim 1 wherein said ex-vessel transfer means comprises:
    a transfer tank; and
    a positioning means disposed on said transfer tank for aligning said fuel assemblies with a chosen location.

3. The system recited in claim 2 wherein said positioning means comprises:
    a rotatable plug; and
    a carriage support disposed on said rotatable plug at an angle relative to the axis of rotation of said rotatable plug whereby said rotatable plug positions said carriage support.

4. The system recited in claim 2 wherein said positioning means comprises:
    a first rotatable plug;
    a second rotatable plug disposed eccentrically relative to said first rotatable plug;
    a pivoting point disposed on said first rotatable plug;
    a lifting mechanism disposed on said first rotatable plug; and
    a carriage support having one end attached to said pivoting point and having its other end attached to said lifting mechanism, said carriage support being capable of pivoting about said pivoting point in a vertical plane.

5. The system recited in claim 1 wherein said ex-vessel transferring means comprises:
    a transfer tank;
    a positioning means disposed on said transfer tank; and
    a transporting means cooperating with said positioning means for transporting said fuel assemblies.

6. The system recited in claim 5 wherein said positioning means comprises:
    a rotatable plug; and
    a carriage support disposed on said rotatable plug at an angle relative to the axis of rotation of said rotatable plug whereby said rotatable plug positions said carriage support.

7. The system recited in claim 5 wherein said positioning means comprises:
    a first rotatable plug;
    a second rotatable plug disposed eccentrically relative to said first rotatable plug;
    a pivoting point disposed on said first rotatable plug;
    a lifting mechanism disposed on said first rotatable plug; and
    a carriage support having one end attached to said pivoting point and having its other end attached to said lifting mechanism, said carriage support being capable of pivoting about said pivoting point in a vertical plane.

8. The system recited in claim 5 wherein said transporting means comprises:
    a carriage capable of transporting a fuel assembly;
    a carriage control means associated with said carriage capable of manipulating said carriage; and
    a grapple capable of manipulating a fuel assembly in relation to said carriage.

* * * * *